(12) United States Patent
Molteni

(10) Patent No.: US 10,768,197 B2
(45) Date of Patent: Sep. 8, 2020

(54) ACCELEROMETER

(71) Applicant: SCHLUMBERGER TECHNOLOGY CORPORATION, Sugar Land, TX (US)

(72) Inventor: Daniele Molteni, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 159 days.

(21) Appl. No.: 14/929,711

(22) Filed: Nov. 2, 2015

(65) Prior Publication Data

US 2016/0124013 A1    May 5, 2016

(30) Foreign Application Priority Data

Nov. 3, 2014 (GB) .................................. 1419588.7

(51) Int. Cl.
*G01P 15/093* (2006.01)
*G01D 5/353* (2006.01)
*G01H 9/00* (2006.01)

(52) U.S. Cl.
CPC .......... *G01P 15/093* (2013.01); *G01D 5/353* (2013.01); *G01H 9/004* (2013.01)

(58) Field of Classification Search
CPC ...... G01P 15/093; G01H 9/004; G01H 9/006; G01D 5/353–35306
USPC .......................... 73/514.26; 356/482; 385/13
See application file for complete search history.

(56) References Cited

U.S. PATENT DOCUMENTS

| 4,613,752 A | 9/1986 | Davis |
| 4,671,113 A | 6/1987 | Carome |
| 4,739,661 A | 4/1988 | Bucholtz et al. |
| 4,829,821 A | 5/1989 | Carome |
| 4,893,930 A | 1/1990 | Garrett et al. |
| 5,818,982 A | 10/1998 | Voss et al. |
| 6,575,033 B1 | 6/2003 | Knudsen et al. |

(Continued)

FOREIGN PATENT DOCUMENTS

| CN | 2643296 Y | 9/2004 |
| CN | 101907722 A | 12/2010 |

(Continued)

OTHER PUBLICATIONS

Cranch, G. A. et al., "High-Responsivity Fiber-Optic Flexural Disk Accelerometers", Journal of Lighwave Technology, 2000, 18(9), pp. 1233-1243.

(Continued)

*Primary Examiner* — David A. Rogers

(57) ABSTRACT

An accelerometer device (100) comprises a former (118) and an optical fiber (120) wound around the former. The winding of optical fiber (120) has a sensing portion (126) that is free to move in relation to a direction of desired sensitivity (128). A movable element (106) is disposed opposite the sensing portion (126) of the optical fiber (120), the movable element (106) being translatable so as to urge against the sensing portion (126) of the optical fiber (120) from a position external to the winding of the optical fiber (120) in order to vary a length of the optical fiber (120). The variation in the length of the optical fiber (120) caused by the moveable element (106) is indicative of an acceleration in the direction of desired sensitivity (128).

41 Claims, 9 Drawing Sheets

(56) References Cited

U.S. PATENT DOCUMENTS

| | | | |
|---|---|---|---|
| 6,789,424 | B2 | 9/2004 | Knudsen et al. |
| 7,222,534 | B2 | 5/2007 | Maas et al. |
| 7,243,543 | B2 | 7/2007 | Berg et al. |
| 8,079,261 | B2 | 12/2011 | Crickmore et al. |
| 8,155,486 | B2 | 4/2012 | Brady |
| 8,499,638 | B2 | 8/2013 | Furuhaug |
| 2010/0024551 | A1 | 2/2010 | Maguire et al. |
| 2011/0219874 | A1* | 9/2011 | Furuhaug ............... G01H 9/004 73/514.26 |
| 2012/0257208 | A1* | 10/2012 | Andersen ............... G01H 9/004 356/477 |

FOREIGN PATENT DOCUMENTS

| | | |
|---|---|---|
| CN | 202285022 U | 6/2012 |
| EP | 0082615 A1 | 6/1983 |
| GB | 2204679 A | 11/1988 |
| GB | 2424700 A | 10/2006 |
| JP | S58186057 | 10/1983 |
| JP | S61258131 | 11/1986 |
| JP | 2011128128 A | 6/2011 |
| SU | 1534408 A1 | 1/1990 |
| WO | WO9608197 A1 | 3/1996 |
| WO | 2007043716 A1 | 4/2007 |
| WO | WO2011050227 A2 | 4/2011 |
| WO | WO2012177547 A1 | 12/2012 |

OTHER PUBLICATIONS

Kersey, A.D. et al., "High-Sensitivity Fibre-Optic Accelerometer", Electronics Letters, 1982, 18(13), pp. 559-561.

Pechstedt, R.D. et al., "Performance Analysis of a Fiber Optic Accelerometer Based on a Compliant Cylinder Design", Review of Scientific Instruments, 1995, 66(1), pp. 207-214.

Pechstedt, R.D. et al., "Design of a Compliant-Cylinder-Type Fiber-Optic Accelerometer: Theory and Experiment", Applied Optics, 1995, 34, pp. 3009-3017.

Exam Report of GB Application No. 1419588.7 dated Aug. 16, 2017, 7 pages.

Examination Report of GB Patent Application No. 1419588.7, dated Apr. 23, 2019, 7 pages.

Examination Report of GB Patent Application No. 1419588.7, dated Aug. 28, 2019, 7 pages.

Combined Search and Examination Report of GB Patent Application No. 1903385.1, dated Apr. 9, 2019, 24 pages.

Search Report of GB Patent Application No. 1903385.1, dated Jul. 17, 2019, 11 pages.

Examination Report of GB Patent Application No. 1903385.1, dated Jul. 19, 2019, 6 pages.

Examination Report of GB Patent Application No. 1903385.1, dated Aug. 7, 2019, 6 pages.

Examination Report of GB Patent Application No. 1903385.1, dated Aug. 28, 2019, 6 pages.

* cited by examiner

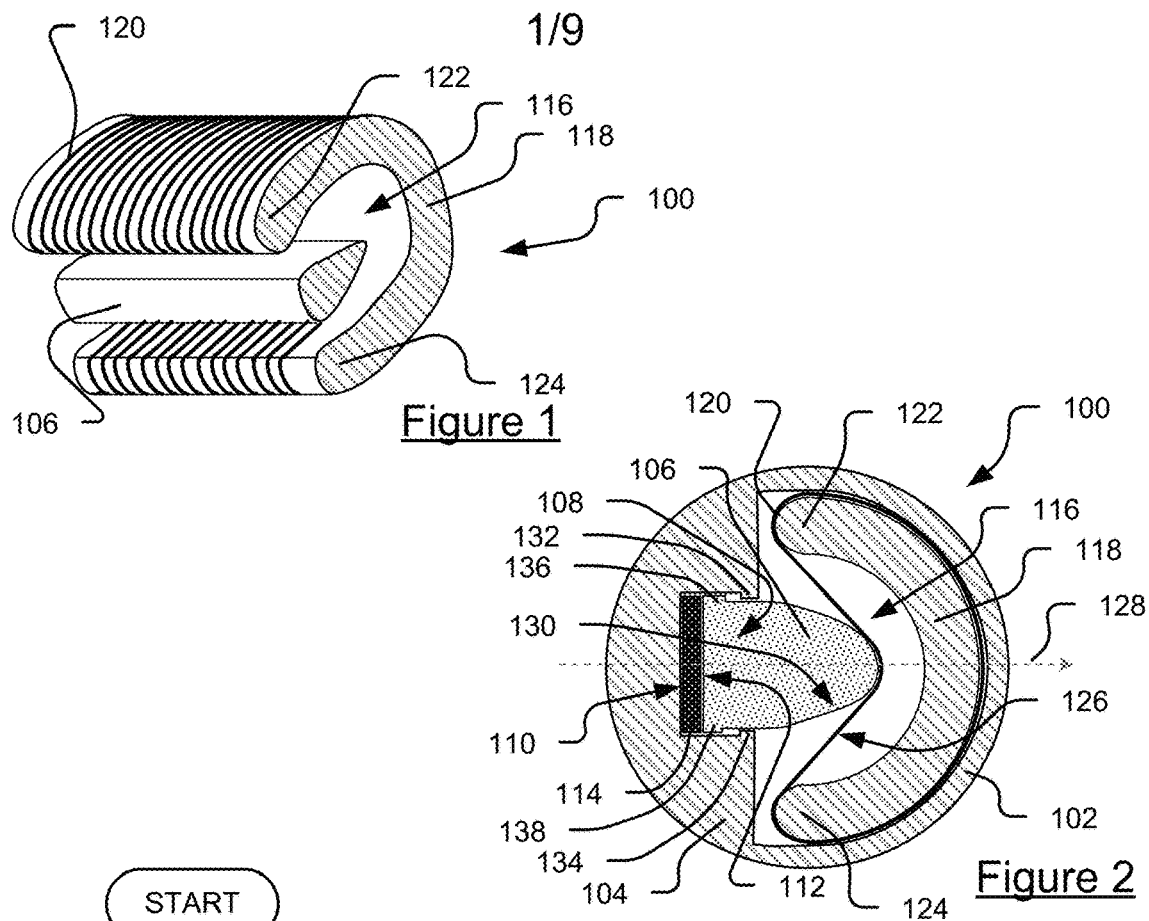

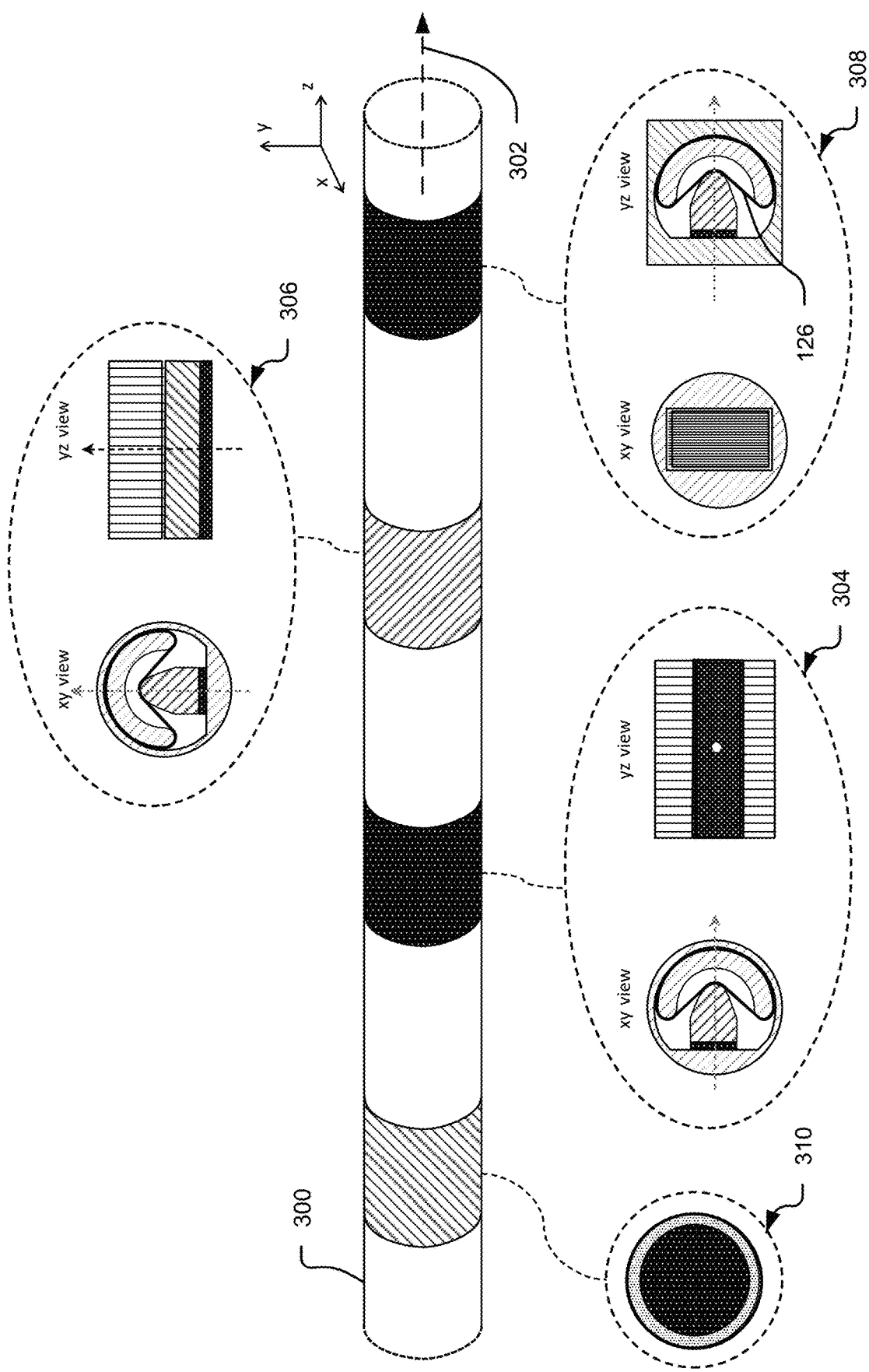

ACCELEROMETER

CROSS-REFERENCE TO RELATED APPLICATIONS

This application claims the benefit of United Kingdom patent application serial number 1419588.7, filed Nov. 3, 2014 and titled ACCELEROMETER, the entire disclosure of which is herein incorporated by reference.

BACKGROUND

Embodiments of the present disclosure relate to an accelerometer device comprises an optical fiber arranged to be deformable in response to a component of an acceleration event in a direction of a desired sensitivity, deformation of the optical fiber varying the length thereof, which is indicative of an acceleration. Embodiments of the present disclosure also relate to a method of sensing an acceleration, for example, a method where an optical fiber deforms in response to a component of an acceleration event in a direction of desired sensitivity, the deformation varying the length of the optical fiber, which is indicative of an acceleration.

In the field of oilfield services, it is known to use sensors in order to monitor acceleration as part of a monitoring program for boreholes and when deploying underwater sensing cables. In various environments, it is desirable to measure acceleration induced by acoustic wavefields. For example, it is known to bury Ocean Bottom Cables (OBCs) beneath the seabed in order to monitor various parameters associated with a reservoir, such monitoring being known as permanent reservoir monitoring. In another example, it is known to deploy towed streamers for hydrocarbon discovery, and it is desirable to measure accelerations induced by acoustic wavefields in respect of each streamer.

Traditionally, the accelerometers employed for such applications rely upon an electronic principle of operation, for example the so-called piezoelectric effect. However, it may be desirable to employ a passive solution in the form of fiber-optic sensors, for reasons of, for example, power efficiency and size. Many such passive solutions are based upon the principle that a winding of optical fiber, when deformed, changes its length and the change in length can be measured. Furthermore, the deformation can be achieved through use of a mass contacting the optical fiber in response to an acceleration event, the mass causing the optical fiber to deform outwardly from within the winding.

Different optical devices and methods exist for measuring acceleration. For example, U.S. Pat. No. 7,243,543 relates to a so-called highly sensitive accelerometer. The accelerometer comprises a lozenge-shaped former about which an optical fiber is coiled. A mass is disposed within the coil and moveable in the direction of the winding of the coil. However, due to the limitations imposed by locating the mass within the coil, the sensitivity of detection of acceleration may be limited and the overall dimensions of the accelerometer may be undesirably large for deployment in a cable.

U.S. Pat. No. 8,499,638 describes to a fiber-optic accelerometer and a method of manufacturing a fiber-optic accelerometer. Such accelerometers comprise a module for making measurements in a given axis. The module includes a coil of optical fiber and a translatable mass disposed within the coil. The mass is disposed at a slant angle relative to a central axis of the coil. However, the design of the module limits the size of the mass and so limits the sensitivity of the module.

U.S. Pat. No. 7,222,534 relates to an optical accelerometer, optical inclinometer and seismic sensor system comprising a beam having at least one optical fiber affixed to a side of the beam. However, a three component accelerometer formed using the optical accelerometers described therein is of a size that is incompatible with insertion in a towed streamer or an ocean bottom cable. Indeed, for ocean bottom cables, the three component accelerometer would need to be housed in a node on the seabed.

U.S. Pat. No. 8,079,261 discloses to an accelerometer having a compliant cylindrical member over which optical fiber is coiled. A piston-like inner mass is disposed within the cylindrical member, but having a shoulder that engages an end of the cylindrical member so that axial movement of the mass results in deformation of the compliant cylindrical member and so deformation of the optical fiber. However, the design of the accelerometer results in a somewhat bulky device for measuring accelerations in respect of three dimensions of a coordinate system. Additionally, the use of a compliant material having a Young's modulus such that it is capable of axial compression under low levels of loading may result in an accelerometer lacking in longevity; this would be particularly disadvantageous for ocean bottom applications.

BRIEF SUMMARY

This summary is provided to introduce a selection of concepts that are further described below in the detailed description. This summary is not intended to identify key or essential features of the claimed subject matter.

According to a first aspect of the present disclosure, there is provided an accelerometer device comprising a former and an optical fiber wound around the former. The winding of optical fiber on the former has a sensing portion that is free to move in relation to a direction of desired sensitivity. A movable element is disposed opposite the sensing portion of the optical fiber. The movable element is configured so that it can move against the sensing portion to vary a length of the optical fiber. This variation in the length of the optical fiber caused by the movement of the moveable element is indicative of an acceleration in the direction of desired sensitivity.

Features of embodiments of the present disclosure are now provided, these features may, where compatible, be used in any combination.

The device may further comprise a biasing element coupled to the movable element and arranged to limit force applied by the movable element to the sensing portion of the optical fiber.

The device may further comprise a protective stop configuration arranged to prevent translation of the movable element beyond a predetermined travel distance.

The device may further comprise an interferometer operably coupled to or integrally formed with the optical fiber.

The interferometer may be a Michaelson interferometer, a Fabry-Perot interferometer, or a Mach-Zehnder interferometer.

The device may further comprise a coherent optical time domain reflectometer operably coupled to the optical fiber.

The device may further comprise an anchoring member; the anchoring member may be disposed in a fixed relation with respect to the sensing portion of the optical fiber, wherein the movable element may be operably coupled to the anchoring member via the biasing element.

The device may further comprise a housing having a longitudinal axis.

The device may further comprise a housing, where the housing may comprise the anchoring member and may house the former, the optical fiber and the movable element.

The anchoring element may be integrally formed with the housing.

The former may be fixed with respect to the housing.

The movable element may be coupled to the sensing portion of the optical fiber.

The sensing portion of the optical fiber may be, when in use, deformable by the movable element.

The movable element may be arranged to provide a conduit, a strand of the sensing portion of the optical fiber passing through the conduit.

The sensing portion of the optical fiber may comprise a plurality of strands of optical fiber and the movable element may comprise a plurality of conduits. In an embodiment of the present disclosure the plurality of strands may respectively pass through the plurality of conduits. In some embodiments, the plurality of conduits may be spaced to preserve relative positions of the plurality of strands of optical fiber.

The movable element may be arranged to provide a channel and a strand of the sensing portion of the optical fiber may extend substantially within the channel.

The sensing portion of the optical fiber may comprise a plurality of strands of optical fiber, the movable element may comprise a plurality of guides and the plurality of guides may be arranged to receive the plurality of strands of optical fiber and preserve relative position of the plurality of strands of optical fiber.

The plurality of guides may be a comb structure.

The plurality of guides may be a plurality of channels and the plurality of strands may respectively extend substantially within the plurality of channels, where the plurality of channels may be spaced to preserve relative position of the plurality of strands of optical fiber.

The movable element may comprise a mass.

According to a second aspect of the present disclosure, there is provided the device as set forth above in relation to the first aspect of the disclosure, where the device may further comprise a housing having a longitudinal installation axis. In such an aspect, the sensing portion of the optical fiber may be inclined relative to the installation axis.

Features of embodiments of the present disclosure are now provided, these features may, where compatible, be used in any combination.

The former may be shaped to define a former slope inclined relative to the installation axis; the sensing portion of the optical fiber around the former may thereby follow the former slope and extend at an incline relative to the installation axis.

The moveable element may be arranged in sloping relation to the installation axis.

The contact surface of the moveable element may slope relative to the installation axis. The device may further comprise a housing having an installation axis, wherein the anchoring member may comprise a sloped surface inclined relative to the installation axis.

The former may be shaped to define a former slope inclined relative to the installation axis; the sensing portion of the optical fiber wound around the former may thereby follow the former slope and extend at an incline relative to the installation axis; and the sloped surface may extend substantially in parallel with the former slope followed by the sensing portion of the optical fiber wound around the former.

The sensing portion of the winding of optical fiber may be preceded by a first winding of optical fiber coupled to, or integrally formed with, a first end region of the winding of optical fiber and the sensing portion may be followed by a second winding of optical fiber coupled to, or integrally formed with, a second end region of the winding of optical fiber. When measuring deformation of the sensing portion, any suitable distributed strain measurement apparatus, for example a reflectometer, such as a coherent optical time domain reflectometer may be arranged to measure respective propagation speeds of an electromagnetic radiation signal through the first winding and the second winding. The reflectometer may be arranged to calculate a degree of deformation of the sensing portion using the measured respective propagation speeds.

According to a third aspect of the present disclosure, there is provided a cable comprising a first accelerometer device as set forth above in relation to the first aspect of the disclosure.

The cable may have a substantially circular cross-section.

According to a fourth aspect of the present disclosure, there is provided a seismic streamer comprising the cable as set forth above in relation to the first aspect of the disclosure.

According to a fifth aspect of the present disclosure, there is provided an ocean bottom cable as set forth above in relation to the third aspect of the disclosure.

The cable may further comprise a second accelerometer device as set forth above in relation to the first aspect of the disclosure and a peripheral wall defining a conduit having a cable longitudinal axis, wherein the first accelerometer device may be oriented within the conduit so that the direction of desired sensitivity of the first accelerometer is a first direction relative to the cable longitudinal axis. The second accelerometer device may be oriented within the conduit so that the direction of desired sensitivity of the second accelerometer may be a second direction relative to the cable longitudinal axis and the first direction may be different from the second direction.

The cable may comprise a third accelerometer device as set forth above in relation to the first aspect of the disclosure. The third accelerometer device may be oriented within the conduit so that the direction of desired sensitivity of the third accelerometer device may be a third direction relative to the cable longitudinal axis. The third direction may be different to the first and second directions. The third direction may be substantially perpendicular to the first direction or the second direction. The third direction may be parallel with the cable longitudinal axis.

The cable may comprise a pressure sensor.

The first direction may be substantially perpendicular to the second direction.

The first and second directions may be substantially perpendicular to the cable longitudinal axis.

According to a sixth aspect of the present disclosure, there is provided a cable comprising a first accelerometer device as set forth above in relation to the second aspect of the disclosure, a second accelerometer device as set forth above in relation to the second aspect of the disclosure, and a third accelerometer device as set forth above in relation to the second aspect of the disclosure, wherein the first, second and third accelerometer devices are disposed and oriented in the cable in order to provide sensitivity to acceleration in a first, second, third, fourth, fifth and sixth direction of a coordinate system.

According to a seventh aspect of the present disclosure, there is provided a cable comprising a first accelerometer device as set forth above in relation to the second aspect of the disclosure; a second accelerometer device as set forth above in relation to the second aspect of the disclosure; a peripheral wall defining a conduit having a cable longitudinal axis, wherein the first accelerometer device is oriented within the conduit so that a first component of the direction of desired sensitivity of the first accelerometer device is a first direction relative to the cable longitudinal axis, a second component of the direction of desired sensitivity of the first accelerometer device is a second direction relative to the cable longitudinal axis and a third component of the direction of sensitivity of the first accelerometer is a third direction relative to the cable longitudinal axis; and the second accelerometer device is oriented within the conduit so that a first component of the direction of desired sensitivity of the second accelerometer device is the fourth direction relative to the cable longitudinal axis, a second component of the direction of sensitivity of the second accelerometer device is substantially the second direction relative to the cable longitudinal axis, and a third component of the direction of sensitivity of the second accelerometer device is a fifth direction relative to the cable longitudinal axis.

The first direction may be substantially parallel with the cable longitudinal axis.

The second and third directions may be substantially perpendicular with respect to each other and the cable longitudinal axis.

The first and fourth directions may be opposite directions. The third and fifth directions may be opposite directions.

The cable may further comprise a third accelerometer device as set forth above in relation to the second aspect of the disclosure. The third accelerometer device may be oriented within the conduit so that a first component of the direction of desired sensitivity of the third accelerometer device may be the first direction relative to the cable longitudinal axis; a second component of the direction of desired sensitivity of the third accelerometer device may be a sixth direction relative to the cable longitudinal axis; and a third component of the direction of sensitivity of the third accelerometer device may be the third direction relative to the cable longitudinal axis.

The sixth direction and the second direction may be opposite directions.

The fourth direction may be parallel with the cable longitudinal axis.

According to an eighth aspect of the present disclosure, there is provided a seismic streamer comprising the cable as set forth above in relation to the seventh aspect of the disclosure.

According to a ninth aspect of the present disclosure, there is provided an ocean bottom cable comprising the cable as set forth above in relation to the seventh aspect of the disclosure.

According to a tenth aspect of the present disclosure, there is provided a method of sensing acceleration, the method comprising: providing a winding of optical fiber having a sensing portion that is free to move in relation to a direction of desired sensitivity; disposing a moveable element opposite the sensing portion of the optical fiber and external to the winding of optical fiber; moving a movable element in response to an acceleration event in order to vary contact between the movable element and the sensing portion of the optical fiber, thereby varying a length of the optical fiber, the variation in the length of the optical fiber being indicative of an acceleration in the direction of desired sensitivity.

The variation in the length of the optical fiber may be measured.

The method may further comprise: providing a housing having a longitudinal installation axis; wherein inclining the sensing portion of the optical fiber relative to the installation axis.

According to an eleventh aspect of the present disclosure, there is provided an accelerometer device comprising: an anchor; a deformable member coupled to the anchor; and an optical fiber coupled to and carried by the deformable member; wherein the deformable member and the optical fiber respectively have capacity to deform in response to a component of acceleration in a direction of desired sensitivity.

The deformable member may comprise a first end and a second end; the deformable member may be coupled to the anchor at first and second ends of the deformable member; and the anchor may be arranged to hold the deformable member in a pre-deformed state, whereby the deformable member may curve between the first and second ends thereof.

The deformable member and the anchor may define an occupied void therebetween; the void may be occupied by a filler material.

The device may further comprise: another deformable member coupled to the anchor; and another optical fiber coupled to and carried by the another deformable member; wherein the another deformable member and the another optical fiber respectively may have capacity to deform in response to a component of acceleration in another direction of desired sensitivity.

The another deformable member may comprise a first end and a second end; the another deformable member may be coupled to the anchor at the first and second ends of the another deformable member; and the anchor may be arranged to hold the another deformable member in another pre-deformed state, whereby the another deformable member may be disposed opposite the deformable member and curves between the first and second ends thereof.

The deformable member and the another deformable member may bow away from each other.

The another deformable member may curve between the first and second ends thereof so as to mirror substantially the curvature of the deformable member.

The deformable member and the another deformable member may define an occupied void; the void may be occupied by a filler material.

The optical fiber may be wound. The another optical fiber may be wound. The device may further comprise a mass coupled to the deformable member.

The device may further comprise a mass coupled to the deformable member and the another deformable member.

The device may further comprise a mass coupled to the deformable member and another mass coupled to the another deformable member.

The sensing portion of the winding of optical fiber may be preceded by a first winding of optical fiber coupled to, or integrally formed with, a first end region of the winding of optical fiber and the sensing portion may be followed by a second winding of optical fiber coupled to, or integrally formed with, a second end region of the winding of optical fiber. When measuring deformation of the sensing portion, any suitable distributed strain measurement apparatus, for example a reflectometer, such as a coherent optical time domain reflectometer may be arranged to measure respective propagation speeds of an electromagnetic radiation signal through the first winding and the second winding. The reflectometer may be arranged to calculate a degree of deformation of the sensing portion using the measured respective propagation speeds.

According to a twelfth aspect of the present disclosure, there is provided a cable comprising a first accelerometer device as set forth above in relation to the eleventh aspect of the disclosure.

According to a thirteenth aspect of the present disclosure, there is provided a seismic streamer comprising the cable as set forth above in relation to the twelfth aspect of the disclosure.

According to a fourteenth aspect of the present disclosure, there is provided an ocean bottom cable comprising the cable as set forth above in relation to the twelfth aspect of the disclosure.

According to a fifteenth aspect of the present disclosure, there is provided a cable comprising the accelerometer device as set forth above in relation to the twelfth aspect of the disclosure, and another deformable member coupled to the anchor; and another optical fiber coupled to and carried by the another deformable member; wherein the another deformable member and the another optical fiber respectively may have capacity to deform in response to a component of acceleration in another direction of desired sensitivity.

According to a sixteenth aspect of the present disclosure, there is provided a cable comprising: a peripheral wall defining a conduit; and an accelerometer arrangement located within the conduit, the accelerometer arrangement comprising: a first accelerometer device as set forth above in relation to the eleventh aspect of the disclosure; a second accelerometer device as set forth above in relation to the eleventh aspect of the disclosure; and a third accelerometer device as set forth above in relation to the eleventh aspect of the disclosure; wherein the first second and third accelerometer devices are respectively arranged within the conduit so as to provide sensitivity in respect of a first direction and a second direction of a first dimension of a coordinate system and a first direction and a second direction of a second dimension of the coordinate system.

The first, second and third accelerometer devices may respectively lie on a first radial line, a second radial line and a third radial line of the conduit; the first, second and third radial lines may be angularly separated with respect to each other.

The angular separation may be substantially 120 degrees.

According to a seventeenth aspect of the present disclosure, there is provided a seismic streamer comprising the cable as set forth above in relation to the sixteenth aspect of the disclosure.

According to an eighteenth aspect of the present disclosure, there is provided an ocean bottom cable comprising the cable as set forth above in relation to the sixteenth aspect of the disclosure.

According to a nineteenth aspect of the present disclosure, there is provided a method of sensing acceleration, the method comprising: coupling an optical fiber to a deformable member so that the deformable member carries the optical fiber; coupling the deformable member to an anchor; and deforming the deformable member and the optical fiber further respectively in response to an acceleration event having an acceleration component in a direction of desired sensitivity.

The method may further comprise: coupling another optical fiber to another deformable member so that the another deformable member carries the another optical fiber; coupling the another deformable member to the anchor; and deforming the another deformable member and the another optical fiber respectively in response to the acceleration event having the acceleration component in another direction of desired sensitivity.

It is thus possible to provide an accelerometer device capable of sensing acceleration with improved sensitivity over many know types of passive accelerometer. The accelerometer device is particularly suited to construction of accelerometers sensitive to acceleration events having acceleration components in more than one dimension of a coordinate system. The accelerometer device and method also supports a compact device format, more suited to insertion into cables than other accelerometer architectures. The accelerometer device further benefits from reduced likelihood of damage to the optical fiber from excessive forces applied thereto. The structure of the accelerometer device is also relatively simple and has improved longevity, which is particularly important for ocean bottom applications.

BRIEF DESCRIPTION OF THE DRAWINGS

At least one embodiment of the disclosure will now be described, by way of example only, with reference to the accompanying drawings, in which:

FIG. 1 is a perspective view of part of an accelerometer device constituting an embodiment of the disclosure;

FIG. 2 is a schematic diagram of an accelerometer device in cross-section, employing the operational principle of the accelerometer device according to the embodiment of FIG. 1;

FIG. 3 is a flow diagram of a method of sensing an acceleration using the accelerometer device of FIG. 2 and constituting another embodiment of the disclosure;

FIG. 4 is a schematic diagram of a cable comprising a number of the accelerometer devices of FIG. 2 and constituting yet another embodiment of the disclosure;

Figure 5:
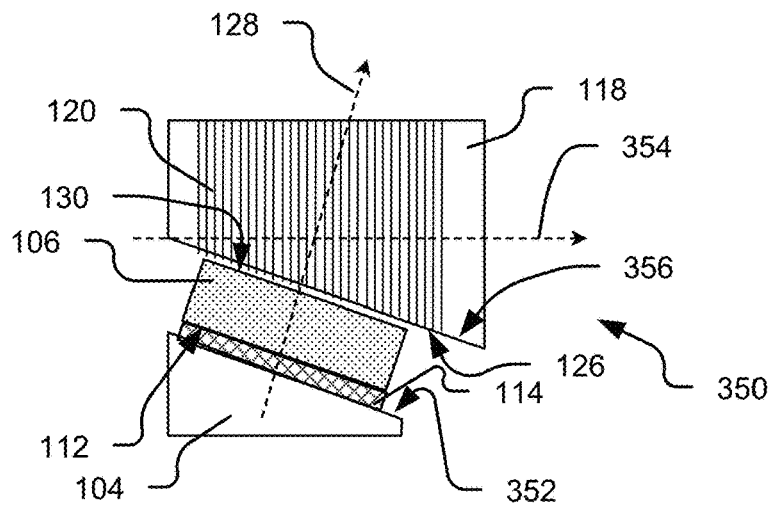
FIG. 5 is a schematic diagram of a multi-component accelerometer device constituting a further embodiment of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIGS. 1 and 2, an accelerometer device 100 comprises a housing 102 having an anchor portion 104 serving as an anchoring member for a moveable element 106. In this example, the moveable element 106 is a mass, but the skilled person will appreciate that if the moveable element 106 requires to be of a particular form, the moveable element 106 can still comprise the mass. For example, the moveable element 106 can be of a design that surrounds, at least in part, optical fiber(s) as will be described later herein, and so requires a particular shape, but also mass. The anchor 104 is, in this example, integrally formed with the housing 102. The housing 102 is substantially cylindrical for convenient insertion in a cable and has a longitudinal axis (not shown), for example.

The anchoring member 104 comprises a bore or recess 108 and the mass 106 is seated in the recess 108, a base surface 110 of the anchoring member 104 being coupled to a base surface 112 of the mass 106 via a biasing element 114, for example a spring. Of course, the skilled person will appreciate that the biasing element can be formed from any suitable structure and/or material, for example any suitable metal alloy for a given application. The dimensions of the mass 106 and/or the force applied by the biasing element 114 can be set so as to influence the sensitivity of the accelerometer device 100.

The mass 106 is semi-elliptical-like in cross section and extends into a hemispherical cavity 116 and along the length of the housing 102 in part. A former 118, which serves as a frame, is disposed within the cavity 116. In this example, the former 118 is crescent shaped, such as an arc or inverted C-shape. The former 118 extends, in part, along the length of the housing 102.

A length of optical fiber 120 is wound around the former 118 along the length of the former 118. A first end 122 and a second end 124 of the former 118 are rounded with a sufficient radius of curvature to prevent breakage of the wound optical fiber 120. On one side of the former 118 the wound optical fiber 120 extends between the first end 122 and the second end 124 of the former 118, constituting a sensing portion 126 of the optical fiber 120. The sensing portion 126 of the winding of optical fiber 120 is not supported in a direction of desired sensitivity 128 of the accelerometer device 100.

The degree of movement of the sensing portion 126 is within the boundary of mechanical limits of the optical fiber 120. In this respect, such mechanical limits are constrained by the requirement of the optical fiber 120 relating to unwanted losses of electromagnetic radiation and structural fragility. As mentioned above, the former 118 serves as a frame to shape the winding of optical fiber 120. The shape of the wound optical fiber 120 is such that a portion or region of the wound optical fiber 120 is free to move and/or deform in a desired direction dictated by the shape of the frame, the desired direction corresponding, in this example, to the direction of the desired sensitivity 128. In this respect, the frame provides a gap to be bridged by the wound optical fiber 120, the portions of the optical fiber 120 bridging the gap being unsupported and hence free to deform across the gap. The tension of the optical fiber 120 wound around the former 118 is another parameter affecting sensitivity of the accelerometer device 100. Additionally or alternatively, the moveable element 106 can rest against the sensing portion 126 of the winding of optical fiber 120 when in a neutral state so as to provide initial pre-deformation of the sensing portion 126.

Referring back to FIG. 1, the moveable element 106 has a contact surface 130 that is opposite the sensing portion 126 of the winding of optical fiber 120, and external to the winding of the optical fiber 120. The former 118 with the optical fiber 120 wound around it is fixed within the housing 102, opposite the anchoring member 104, in this example. As such, the anchoring member 104 is disposed in a fixed relation with respect to the sensing portion 126 of the optical fiber 120. As mentioned above, the mass 106 is anchored and so limited in its degree of travel.

In this respect, in order to prevent excessive force being applied to the sensing portion 126 of the wound optical fiber 120, the anchoring member 104 comprises a first protective stop 132 and a second protective stop 134. The mass 106 comprises a first shoulder 136 and a second shoulder 138, the mass 106 being slideably disposed within the recess 108. The first and second protective stops 132 and the first and second shoulders 136, 138 serve as a protective stop configuration to prevent translation of the mass 106 beyond a predetermined travel distance.

In operation (FIG. 3), an acceleration event occurs (Step 200) having an acceleration component in the direction of desired sensitivity 128. The mass 106 therefore translates in one direction in the recess towards the sensing portion 126 of the winding of optical fiber 120 until the contact surface 130 of the mass 106 touches the sensing portion of the optical fiber 120 and urges (Step 202) against the sensing portion 126 of the wound optical fiber 120. The application of force by the mass 106 upon the sensing portion 126 of the optical fiber 120 therefore results in the sensing portion 126 of the optical fiber 120 deforming and causing a variation in the length (Step 204) of the wound optical fiber 120 that can be measured using a variety of different techniques. The variation in the length of optical fiber 120 is therefore indicative of the acceleration event having the acceleration component in the direction of desired sensitivity 128.

In this example, the mass 106 is not in contact with the sensing portion 126 when the device 100 is in a neutral state, i.e. not exposed to an acceleration event. Such an implementation can be varied, for example the distance of the mass 106 from the sensing portion 126 can vary to make the device sensitive to acceleration events above a predetermined threshold value and/or a minimum duration. Similarly, in some embodiments, it may be desirable for the contact surface 130 of the mass 106 to rest against the sensing portion 126 when the device 100 is in the neutral state. The change in length of the optical fiber 120 can be measured (Step 206) using, for example, an interferometer operably coupled to or integrally formed with the optical fiber 120, such as a Michelson interferometer, a Fabry-Perot interferometer, a Mach-Zehnder interferometer and/or the like. Alternatively, a distributed strain measurement apparatus, for example a coherent optical time domain reflectometer (based upon a distributed scattering sensing principle), a Distributed Acoustic Sensing (DAS) system, a heterodyne Distributed Vibration Sensor (hDVS) and/or the like can be operably coupled to the optical fiber 120 to measure the change in length of the optical fiber 120.

In order to prevent excessive travel of the mass 106 and hence the application of excessive force to the sensing portion 126 of the optical fiber 120, the first and second protective stops 132, 134 engage with the first and second shoulders 136, 138 to prevent further movement of the mass 106 towards the sensing portion 126 of the wound optical fiber 120, the first and second protective stops 132, 134 serving as end stops. Additionally, the motion of the mass 106 is damped by the biasing element 114 in order to prevent the sensing portion 126 of the optical fiber 120 being damaged by excessive rates of acceleration of the mass 106. In this respect, the biasing element 114 is another provision to limit force applied by the mass 106 to the sensing portion 126 of the optical fiber 120.

Turning to FIG. 4, the above-described accelerometer device 100 can be installed in a cable 300, for example a sensing cable, such as a seismic streamer; an ocean bottom cable; a borehole cable, such as a seismic borehole cable; or a seismic cable. The cable 300 can have a circular cross-section and can therefore serve as a conduit having a peripheral wall and a cable longitudinal axis. In this regard, due to the outer shape, or form factor, of the accelerometer device 100, the cylindrical shaped housing 102 of the accelerometer device 100 facilitates installation in the conduit for sensing accelerations in a plane substantially orthogonal to the longitudinal axis 302 of the cable 300. For example, a first accelerometer device 304 of the structure of the accelerometer device 100 is, in this example, installed in the cable 300 so that the direction of desired sensitivity lies substantially in a first dimension of a coordinate system, for example an x-axis of a Cartesian coordinate system. A second accelerometer device 306 also of the structure of the accelerometer device 100 is installed in the cable 300 so that the direction of desired sensitivity of the second accelerometer device 306 lies in a second dimension of the coordinate system, for example a y-axis of the Cartesian coordinate system. Consequently, the directions of the desired sensitivity of the first and second accelerometer devices 304, 306 when installed in the cable 300 are substantially orthogonal, i.e. they are different. Furthermore, the directions of desired sensitivity are substantially perpendicular to the cable longitudinal axis.

In order to sense accelerations parallel to the longitudinal axis 302 of the cable 300, a third accelerometer device 308 is installed in the cable 300 so that the sensing portion 126 of the optical fiber 120 of the third accelerometer device 308 extends substantially orthogonally to the longitudinal axis 302. The direction of desired sensitivity therefore lies substantially in a third dimension of the coordinate system, for example a z-axis of the Cartesian coordinate system. As can be seen, first, second and third accelerometer devices 304, 306, 308 are oriented within the cable 300 so that the respective directions of desired sensitivity of the first, second and third accelerometer devices 304, 306, 308 are orthogonal, the third direction of sensitivity being substantially parallel with the cable longitudinal axis. For some applications, a pressure sensor 310 is also installed in the cable 300. Since the use of the pressure sensor 310 is not central to an understanding of the inventive concepts set forth herein, for the sake of conciseness and clarity of description the pressure sensor 310 and its use will not be described in any further detail.

In operation, acceleration events experienced by the cable 300 and having an acceleration component in the dimension of the x-axis are sensed by the first accelerometer device 304 and acceleration events experienced by the cable 300 and having an acceleration component in the dimension of the y-axis are sensed by the second accelerometer device 306. Similarly, acceleration events experienced by the cable 300 and having an acceleration component in the dimension of the z-axis are sensed by the third accelerometer device 308.

In another embodiment (FIG. 5), the limitation of the previous example accelerometer device 100, namely the form factor of the accelerometer device 100 supporting convenient installation in a cable or other conduit to provide the ability to sense acceleration events in three orthogonal directions, is addressed by a multi-component accelerometer device 350. In this respect, the position of the sensing portion 126 of the wound optical fiber 120 relative to the orientation of the contact surface 130 of the mass 106 is arranged so that the direction of desired sensitivity 128 of the multi-component accelerometer device 350 has a first directional sensitivity component, a second directional sensitivity component, and a third directional sensitivity component relative to, and when not aligned with, a coordinate system.

Depending upon an orientation of installation of the accelerometer device 350, a component of the direction of desired sensitivity 128 can be used to sense acceleration events having an acceleration component in one of the longitudinal directions mentioned above, such as in one direction along an axis of installation 354 of the multi-component accelerometer device 350. For example, when installed in the cable 300 of FIG. 3, it is thus possible to measure acceleration events having an acceleration component in a direction along the longitudinal axis 302 of the cable 300.

The parts of the accelerometer device 350 may be installed within an elongate housing (not shown), for example a cylindrical housing, so as to lie longitudinally within the housing. In this example, the mass 106 is permitted to move in a direction having a component that is longitudinal relative to the housing, which would be along or parallel with the axis of installation 354. In order to sense a component of the acceleration that is longitudinal with respect to the housing, the former presents the sensing portion 126 of the wound optical fiber 120 so as to intersect the longitudinal axis or an axis parallel therewith.

Consequently, in this example, the former 118 although having an arc or C-shape cross-section across the longitudinal direction of the former 118, the side elevation is one of a trapezoid shape. However, the skilled person will appreciate that the side elevation of the former 118 can be a trapezium shape. Moreover, the shape of the former 118 needs to be such that the sensing portion 126 of the wound optical fiber 120 is inclined relative to the longitudinal axis 354. The former 118 is thus shaped, in this example, to define a former slope 356 inclined relative to the installation axis 354. When wound around the former 118, the optical fiber 120 follows the former slope 356 and so the sensing portion 126 extends at an incline relative to the installation axis 354. With the sensing portion 126 inclined as described above, this orientation of the sensing portion 126 makes it sensitive to an applied force being or having a component in the direction of the longitudinal axis 354. To achieve this, motion of the mass 106 needs to have a component parallel with the longitudinal axis 354.

As mentioned above, in this example the sensing portion 126 of the wound optical fiber 120 slopes relative to the longitudinal axis 354. Additionally, the anchoring member 104 possesses a sloped surface 352, which in this example is substantially parallel with the sloping sensing portion 126 and hence sloped relative to the installation axis 354. The mass 106 is rectangular in cross-section and extends across at least part of the width of the sensing portion 126. The mass 106 is coupled to the anchor 104 via the biasing element 114. In this example, the mass 106 is located on the slope 352, which is also conceivable in other examples, and as such the mass 106 is arranged in sloping relation to the installation axis 354. Of course, in this and other examples, the contact surface 130 of the mass 106 can slope relative to the installation axis 354. Although not shown in FIG. 5, the range of motion of the mass 106 can be capped through use of stop-like structures of the kind described above.

As can be seen from the above examples, to provide sensitivity in the longitudinal axis 354 of the housing (not shown) of the multi-component accelerometer 350, the sensing portion 126 of the optical fiber 120 is inclined relative to the longitudinal axis 354.

Figure 6:
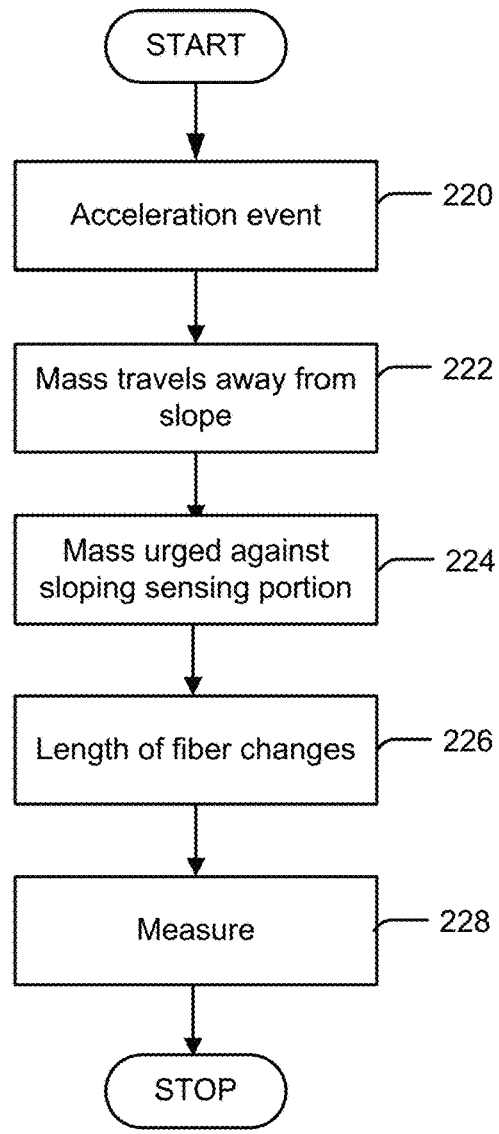
FIG. 6 is a flow diagram of a method of sensing an acceleration using the accelerometer device of FIG. 5 and constituting another embodiment of the disclosure.

In operation (FIG. 6), an acceleration event occurs (Step 220) having an acceleration component along a longitudinal axis 354 of the housing, which is usually the axis of installation. The direction of desired sensitivity 128 of the multi-component accelerometer device 350 has a component of sensitivity in the direction of the longitudinal axis 354 by virtue of the mass 106 travelling towards the sensing portion 126, movement of the mass 106 being influenceable by an acceleration component in the direction of the longitudinal axis 354 (Step 222). In response to the component(s) of acceleration of the acceleration event, the contact surface 130 of the mass 106 is urged (Step 224) against the sensing portion 126 of the wound optical fiber 120.

The application of force by the mass 106 upon the sensing portion 126 of the optical fiber 120 therefore results in a variation in the length (Step 226) of the wound optical fiber 120 that can be measured using a variety of different techniques. The variation in the length of optical fiber 120 is therefore indicative of the acceleration event having a component in the direction of desired sensitivity 128. As in relation to the previous example of the accelerometer device 100, the change in length of the optical fiber 120 can be measured (Step 228) using, for example, an interferometer operably coupled to or integrally formed with the optical fiber 120, such as a Michaelson interferometer, a Fabry-Perot interferometer or a Mach-Zehnder interferometer. Alternatively, a distributed strain measurement apparatus, a coherent optical time domain reflectometer (based upon a distributed scattering sensing principle), a DAS system, or an hDVS can be operably coupled to the optical fiber 120 to measure the change in length of the optical fiber 120.

Figure 7:
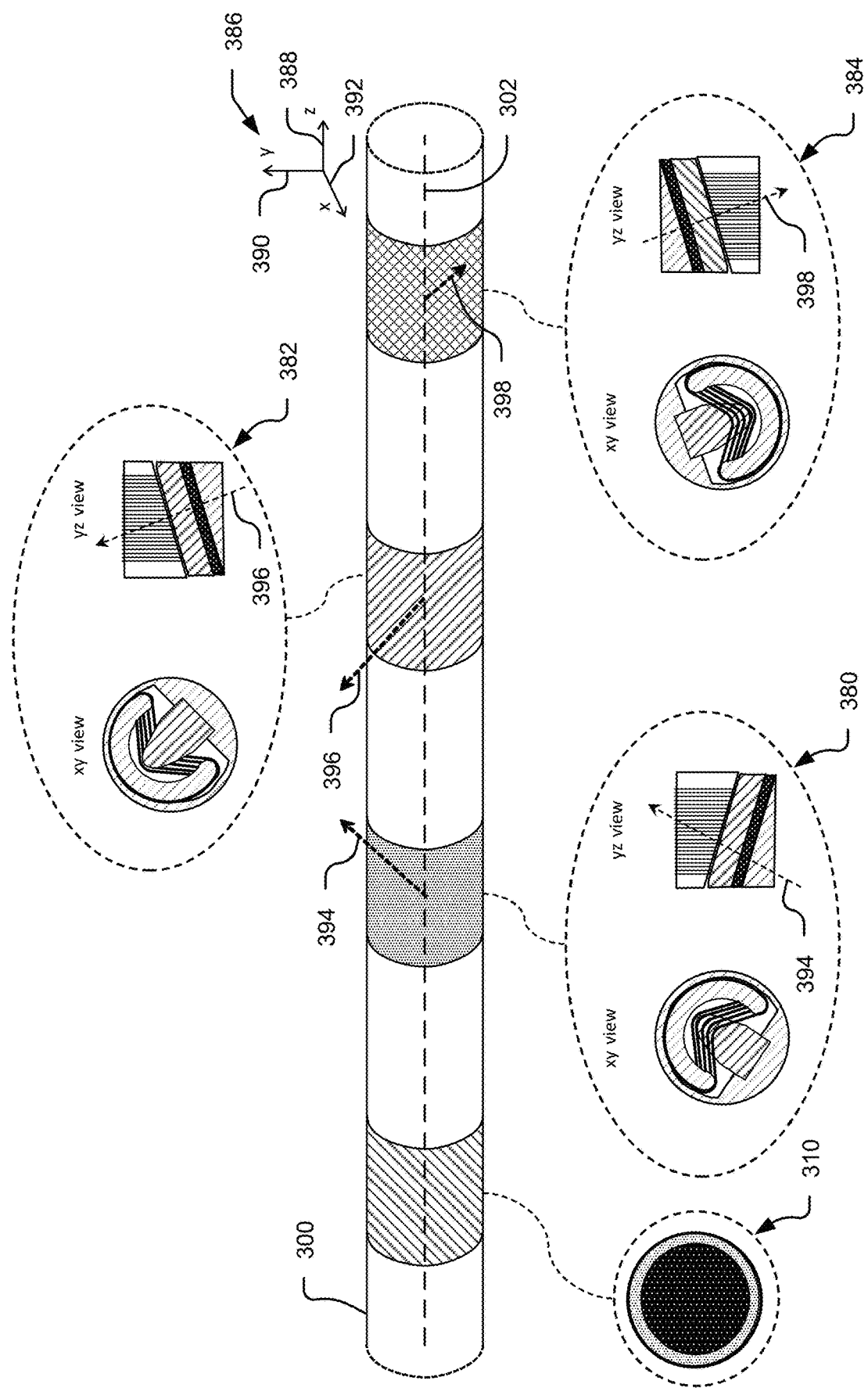
FIG. 7 is a schematic diagram of another cable comprising a number of the accelerometer devices of FIG. 5 and constituting a further embodiment of the disclosure.

Referring to FIG. 7, the multi-component accelerometer device 350 can be installed in a cable 300, for example a sensing cable, such as a seismic streamer; an ocean bottom cable; a borehole cable, such as a seismic borehole cable; or a seismic cable. In this example, the cable 300 is circular in cross-section and can serve as a conduit having a peripheral wall and a cable longitudinal axis 302. A first multi-component accelerometer device 380, of the structure of the multi-component accelerometer device 350 described above, is installed in the cable 300 in a first orientation. A second multi-component accelerometer device 382, of the structure of the multi-component accelerometer device 350 described above, is also installed in the cable 300, but is disposed in a second orientation with respect to the cable 300. A third multi-component accelerometer device 384, of the structure of the multi-component accelerometer device 350 described above, is also installed in the cable 300, but is disposed in a third orientation with respect to the cable 300. As can be seen from the above description, the first, second and third multi-component accelerometer devices 380, 382, 384 are of the same form, but oriented differently with respect to each other and the longitudinal axis 302. In this respect, the first, second and third multi-component accelerometers 380, 382, 284 each have a respective direction of sensitivity, which are orthogonal with respect to each other in three-dimensional space.

Using an example coordinate system, such as a Cartesian coordinate system, a frame of reference 386 can be assigned to the cable 300 as already implied above. In this respect, a first direction 388 along the longitudinal axis 302 corresponds to the z-axis, a second direction 390 orthogonal to the first direction 388 corresponds to the y-axis, and a third direction 392 orthogonal to both the first and second directions 388, 390 corresponds to the x-axis.

As will be appreciated, opposite directions to the first, second and third directions 388, 390, 392 exist in three-dimensional space, and it is necessary to sense accelerations in these opposite directions as well as the first, second and third directions 388, 390, 392. In this respect, the first multi-component accelerometer device 380 has a first direction of desired sensitivity 394 that has first and second components of sensitivity corresponding respectively to the first direction 388 and the second direction 390, i.e. in the z-axis and in the y-axis, respectively. The first direction of desired sensitivity 394 also has a third component of sensitivity that corresponds to the opposite direction to the third direction 392, i.e. in the x-axis but the negative direction. The second multi-component accelerometer device 382 has a second direction of desired sensitivity 396 that has a first component of sensitivity corresponding to the opposite direction to the first direction 388, i.e. in the z-axis but the negative direction, a second component of sensitivity corresponding to the second direction 390, i.e. the y-axis and in the positive direction, and a third component of sensitivity corresponding to the third direction 392 i.e. in the x-axis and in the positive direction. The third multi-component accelerometer device 384 has a third direction of desired sensitivity 398 that has a first component of sensitivity corresponding to the first direction 388, i.e. in the z-axis and in the positive direction, a second component of sensitivity corresponding to the opposite direction to the second direction 390, i.e. in the y-axis but the negative direction, and a third component of sensitivity corresponding to the opposite direction to the third direction 392, i.e. in the x-axis but the negative direction.

Although some components of accelerations are detected by more than one of the first, second and third multi-component accelerometer devices 380, 382, 384, sensitivity to acceleration events is supported in each of the sense directions within the context of the Cartesian coordinate system by at least one accelerometer device. This is possible, because the first, second and third multi-component accelerometer devices 380, 382, 384 are disposed such that the first, second and third directions of desired sensitivity 394, 396, 398 are disposed substantially orthogonally with respect to each other.

The first, second and third accelerometer devices 380, 382, 384 are, in this example, therefore disposed and oriented in the cable 300 in order to provide sensitivity to acceleration in a first, second, third, fourth, fifth and sixth direction of a coordinate system.

For some applications, a pressure sensor 310 is also installed in the cable 300. Since the use of the pressure sensor 310 is not central to an understanding of the inventive concepts set forth herein, for the sake of conciseness and clarity of description, the pressure sensor 310 and its use will not be described in any further detail.

In operation, acceleration events experienced by the cable 300 in the direction 392 along the x-axis are sensed by the second multi-component accelerometer device 382. Acceleration events experienced by the cable 300 in the opposite direction to the direction 392, but still along the x-axis, are sensed by the first multi-component accelerometer devices 380 and the third multi-component accelerometer device 384. Acceleration events experienced by the cable 300 in the direction 390 along the y-axis are sensed by the first and second multi-component accelerometer devices 380, 382, and acceleration events experienced by the cable 300 in the opposite direction to the direction 390, but still along the y-axis, are sensed by the third multi-component accelerometer device 384. Acceleration events experienced by the cable 300 in the direction 388 along the z-axis are sensed by the first and third multi-component accelerometer devices 380, 384, and acceleration events experienced by the cable 300 in the opposite direction to the direction 388, but still along the z-axis, are sensed by the second multi-component accelerometer device 382.

By analyzing output signals of the first, second and third multi-component accelerometer devices 380, 382, 384, in response to an acceleration event, it is possible to determine the direction of each component of the acceleration event. For example, an acceleration event having a component in the direction 388 along the z-axis of the cable 300 yields acceleration detection signals from the first and third multi-component accelerometer devices 380, 384.

Figure 8:
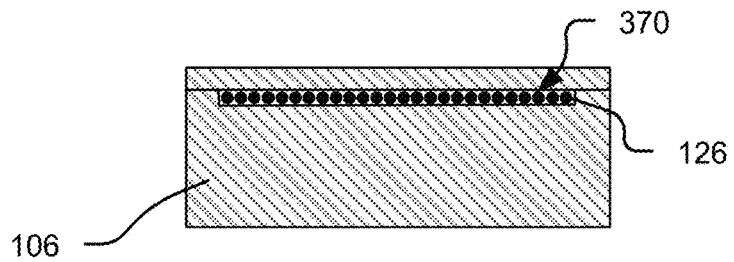
FIGS. 8 to 10 are cross-sectional views of different moveable elements for the accelerometer devices of FIGS. 2 and 5 and constituting different embodiments of the disclosure.

Variations to the above-described examples are contemplated. For example and as suggested above, the structure of the moveable element 106 can be changed so that the moveable element 106 is coupled to the sensing portion 126 of the optical fiber 120. This can be achieved in a number of ways. In one example implementation (FIG. 8), the moveable element 106 comprises a conduit therethrough, for example a slot-shaped conduit 370. The sensing portion 126 of the optical fiber 120 comprises a plurality of strands, at least one of which passes through the conduit. In another implementation, the moveable element 106 can comprise a plurality of conduits and the plurality of strands of optical fiber of the sensing portion 126 described above can respectively extend through the plurality of conduits. The plurality of conduits can be spaced at a pitch that preserves the relative positions of the plurality of strands of optical fiber.

Figure 9:
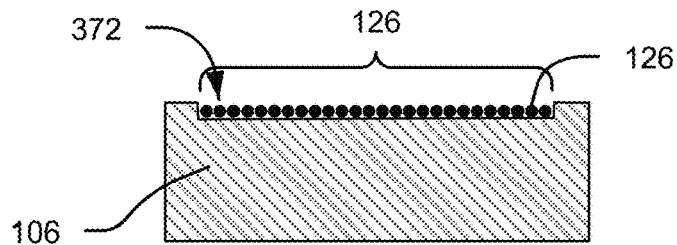

In a further implementation alternative (FIG. 9), the moveable element 106 comprises a channel 372 as opposed to an elongate conduit, and at least one of the strands of the sensing portion 126 of the optical fiber 120 extends substantially within the channel. The channel side walls prevent optical fibers of the sensing portion from splaying laterally and riding over the sides of the moveable element 106.

Figure 10:
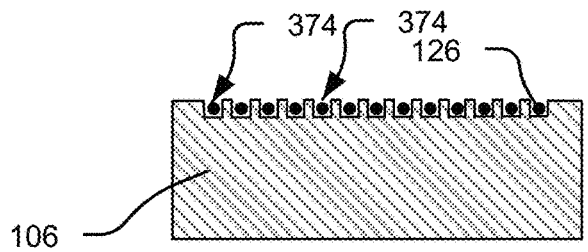

In yet another alternative implementation (FIG. 10), the moveable element 106 comprises a plurality of guides 374. The plurality of guides 374 respectively receive the plurality of strands of the sensing portion 126 of the optical fiber 120, the pitch of the plurality of guides being such that the relative positions of the plurality of strands are preserved. The plurality of guides can be provided by a comb structure. Similarly, the plurality of guides can be a plurality of channels.

Figure 11:
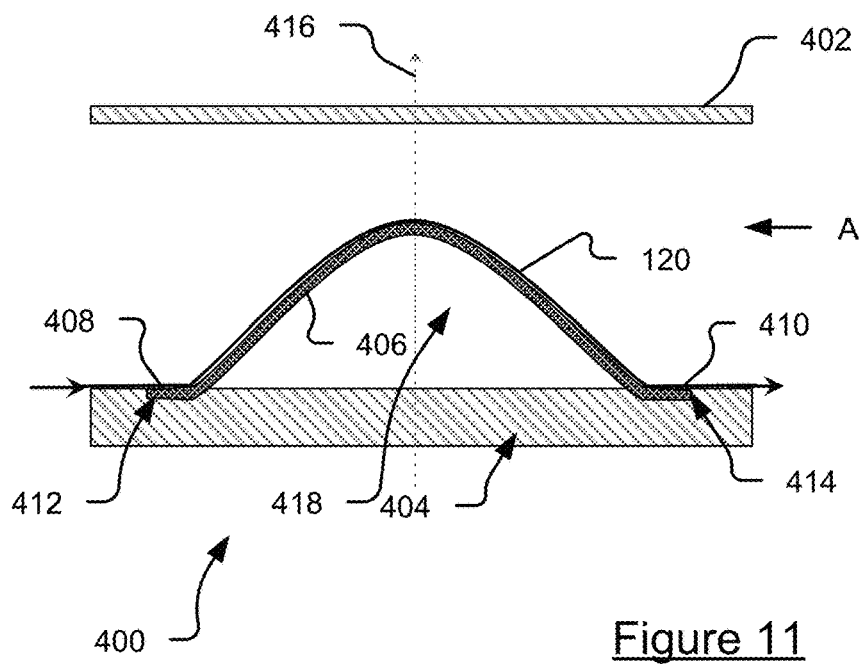
FIG. 11 is a schematic diagram of another accelerometer device constituting another embodiment of the disclosure.
Figure 12:
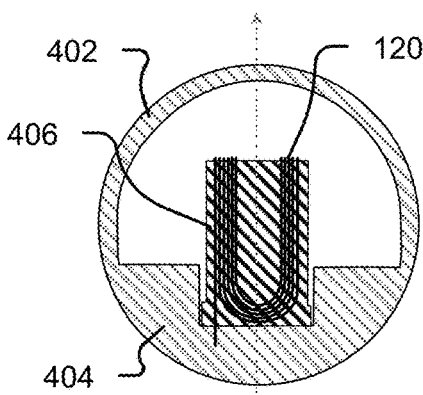
FIG. 12 is a side elevation of the accelerometer device of FIG. 11 from a direction A.
Figure 13:
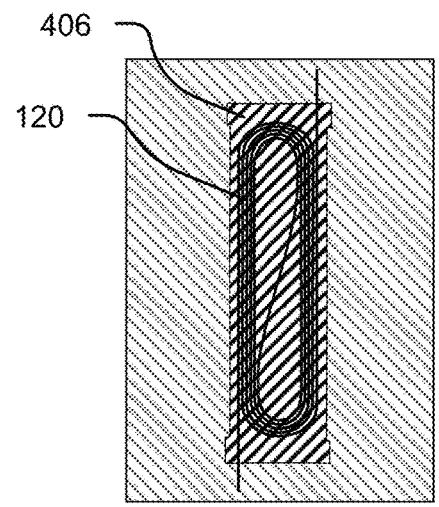
FIG. 13 is a plan view of the accelerometer device of FIG. 11.

Referring to FIGS. 11, 12 and 13, an alternative structure for an accelerometer device 400 comprises a housing 402, for example a cylindrical housing, having an anchoring member 404 serving as an anchor. In this example, the anchoring member 404 is integrally formed with the housing 402. A deformable member 406 has a first end 408 and a second end 410, which are coupled to the anchor 404 at a first anchor point 412 and a second anchor point 414, respectively. The first and second anchor points 412, 414 are spaced so that the deformable member 406 assumes a pre-deformed shape so as to curve between the first and second anchor points 412, 414, for example to curve or bow away from the anchor 404. An optical fiber 120 is coupled to the deformable member 406 so that the optical fiber 120 is carried by the deformable member 406. In this example, the optical fiber 120 is wound so as to follow an elongate path of lozenge-like shape along the length of the deformable member 406. However, the skilled person should appreciate that a single length or pass of optical fiber can be adequate for some applications.

The pre-deformed deformable member 406 and the (pre-deformed) wound optical fiber 120 have capacity to deform further in response to an acceleration event having an acceleration component in a direction of desired sensitivity 416 of the accelerometer device 400. In this example, the deformable member 406 is a biasing member, such as a spring. Any suitable material can be used to form the deformable member 406, depending upon application requirements, for example any suitable metal alloy for a given application. For example, the material of the deformable member 406 can be selected so as to exhibit symmetric deformation in the line of the direction of desired sensitivity 416. In this example, the shape of the deformable member 406, when not deformed, is substantially rectangular, but the deformable member 406 can be of any other suitable shape.

A void 418 is defined between the pre-deformed deformable member 406 and an upper surface of the anchor 404. For some applications, the void is occupied or filled with a filler material, for example a suitable rigid material (not shown) that resists deformation of the pre-deformed deformable member 406 in one direction, typically an opposite direction to the direction of sensitivity. For other applications, it may be desirable to employ a filler material exhibiting a degree of flexibility, for example any suitable elastomeric material.

Figure 14:
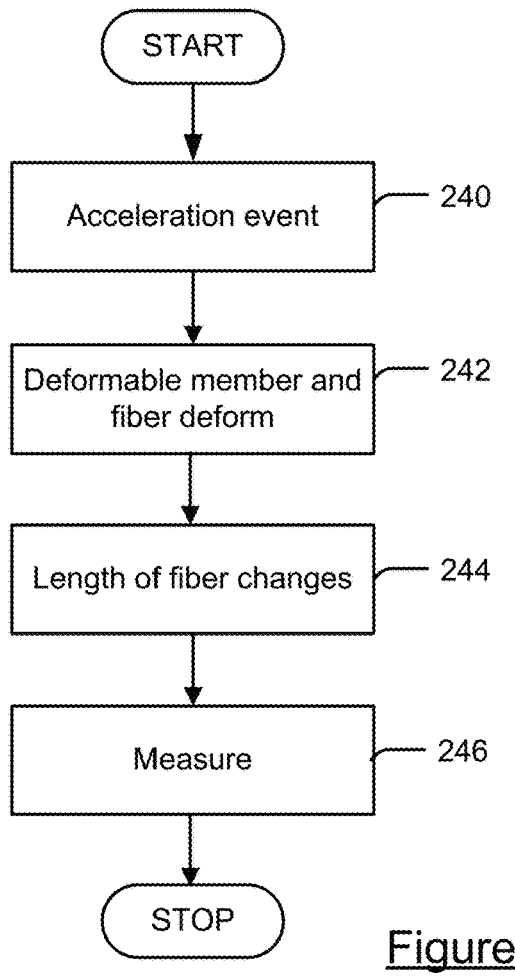
FIG. 14 is a flow diagram of another method of sensing an acceleration using the accelerometer device of FIGS. 11 to 13 and constituting a further embodiment of the disclosure.

In operation (FIG. 14), the accelerometer device 400 is subjected to an acceleration event (Step 240) having a component of acceleration in the direction of desired sensitivity 416 of the accelerometer device 400. In response to the acceleration event, the deformable member 406 deforms in the direction of desired sensitivity, thereby causing the optical fiber 120 carried by the deformable member 406 also to deform (Step 242). As a result of deformation of the optical fiber 120, the length of the optical fiber 120 varies (Step 244). The variation in the length of the optical fiber 120 is therefore indicative of the acceleration event having the acceleration component in the direction of desired sensitivity 416. The change in length of the optical fiber 120 can be measured (Step 246) using, for example, an interferometer operably coupled to or integrally formed with the optical fire 120, such as a Michelson interferometer, a Fabry-Perot interferometer, a Mach-Zehnder interferometer and/or the like. Alternatively, a distributed strain measurement apparatus, a coherent optical time domain reflectometer (based upon a distributed scattering sensing principle), a DAS system, an hDVS and/or the like can be operably coupled to the optical fiber 120 to measure the change in length of the optical fiber 120.

For some applications, in another example, it may be desirable to assist deformation of the deformable member 406 by coupling a mass to the deformable member 406.

The above-described accelerometer device 400 can be installed in a cable, for example a sensor cable as described in relation to previous examples, such as a seismic streamer; an ocean bottom cable; a borehole cable, such as a seismic borehole cable; or a seismic cable.

As implied above, the material from which the deformable member 406 is formed may not support symmetric deformation of the deformable member 406 in the line of the direction of desired sensitivity 416. Therefore, in another embodiment (FIGS. 15 and 16), this limitation can be obviated, or at least mitigated, by providing a bidirectionally sensitive accelerometer device 500 that comprises a housing 502 in which a first deformable member 504 and a second deformable member 506 are disposed. An anchor or anchoring arrangement (not shown) is provided and suspends the first and second deformable members 504, 506 within the housing 502 away from the internal wall of the housing 502.

The first deformable member 504 comprises a first end 508 and a second end 510. Likewise, the second deformable member 506 comprises a first end 512 and a second end 514. The first and second deformable members 504, 506 are disposed opposite each other. The anchor comprises two ends spaced such that the first ends 508, 512 of the first and second deformable members 504, 506 and the second ends 510, 514 of the first and second deformable members 504, 506 are sufficiently close to cause the first and second deformable members 504, 506 to deform and curve between their ends, for example to bow away from each other. The second deformable member 506 curves such that it mirrors the curvature of the first deformable member 504. The first and second deformable members 504, 506 are therefore both pre-deformed.

A first optical fiber 120 is coupled to the first deformable member 504 so that the first optical fiber 120 is carried by the first deformable member 504. In this example, the first optical fiber 120 is wound so as to follow an elongate path of lozenge-like shape along the length of the first deformable member 504. However, the skilled person should appreciate that a single (unwound) length or pass of optical fiber can be adequate for some applications. The pre-deformed first deformable member 504 and the (pre-deformed) wound first optical fiber 120 have capacity to deform further in response to an acceleration event having an acceleration component in a first direction of desired sensitivity 518.

A second optical fiber 516 is coupled to the second deformable member 506 so that the second optical fiber 516 is carried by the second deformable member 506. In this example, the second optical fiber 516 is also wound so as to follow another elongate path of lozenge-like shape along the length of the second deformable member 506. However, the skilled person should appreciate that a single (unwound) length or pass of optical fiber can be adequate for some applications. The pre-deformed second deformable member 506 and the (pre-deformed) wound second optical fiber 516 also have capacity to deform further in response to the acceleration event having an acceleration component in a second direction of desired sensitivity 520.

In this example, the first deformable member 504 is a first biasing member, such as a first spring, and the second deformable member 506 is a second biasing member, such as a second spring. Any suitable material can be used to form the first and second deformable member 504, 506, depending upon application requirements. For example, the material of the deformable members 504, 506 can be selected to exhibit symmetric deformation in the line of the directions of desired sensitivity 518, 520. In this example, the respective shapes of the first and second deformable members 504, 506, when not deformed, are substantially rectangular, but the first and second deformable members 504, 506 can be of any other suitable shape.

A void 522 is defined between the pre-deformed first deformable member 504 and the pre-deformed second deformable member 506. For some applications, the void is occupied or filled with a filler material, for example a suitable rigid material (not shown) that resists deformation of the pre-deformed deformable member 406 in one direction, typically an opposite direction to the direction of sensitivity. For other applications, it may be desirable to employ a filler material exhibiting a degree of flexibility, for example any suitable elastomeric material. The filter material can serve to prevent the first and second deformable members 504, 506 deforming in response to a component of acceleration in a contra-direction to their respective directions of desired sensitivity 518, 520.

Figure 17:
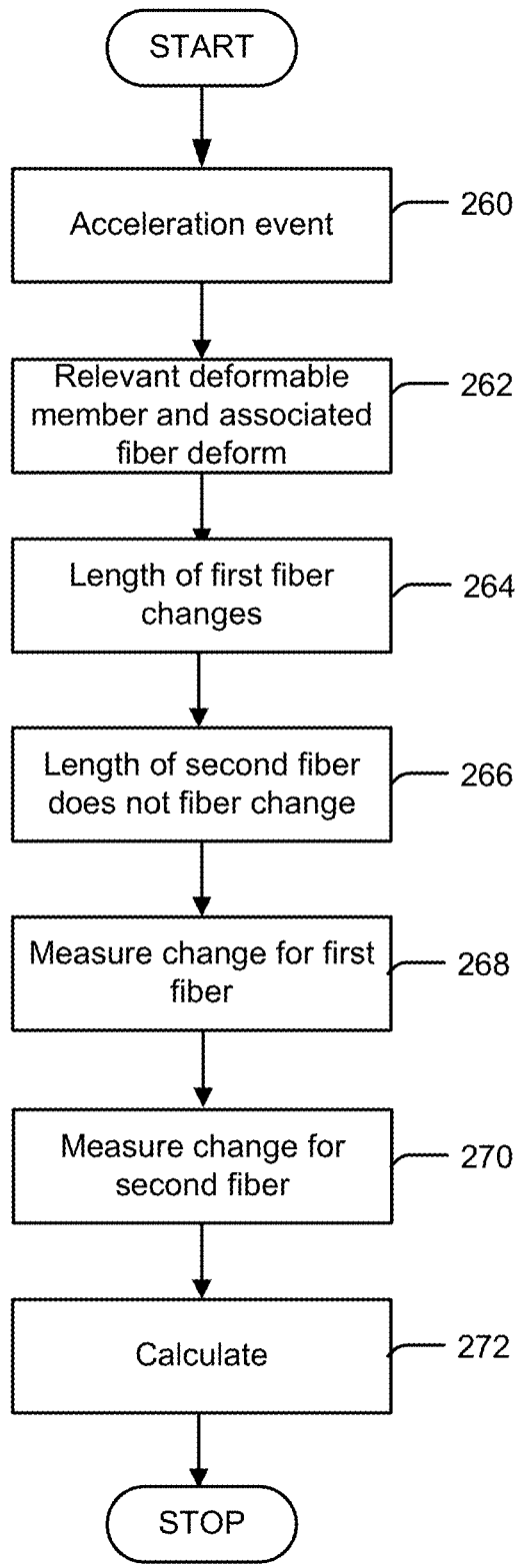
FIG. 17 is a flow diagram of a further method of sensing an acceleration using the accelerometer device of FIGS. 15 and 16 and constituting another embodiment of the disclosure.

In operation (FIG. 17), the bi-directionally sensitive accelerometer device 500 is subjected to an acceleration event (Step 260) having a component of acceleration in the direction of desired sensitivity 518 of the bi-directionally sensitive accelerometer device 500. In response to the acceleration event, the first deformable member 504 deforms in a first direction, thereby causing the first optical fiber 120 carried by the first deformable member 504 to deform (Step 262). However, in response to the acceleration event, the second deformable member 506 does not deform as a result of the filler material, because the acceleration event simply urges the second deformable member 506 against the substantially rigid filler material filling the void 522 and the second deformable member 506 and the filler material are already in contact. Consequently, the second optical fiber 516 does not deform.

As a result of deformation of the first optical fiber 120, the length of the first optical fiber 120 varies (Step 264). The length of the second optical fiber 516 does not vary (Step 266) though. The variation in length of the first optical fiber 120 is therefore indicative of the acceleration event having the acceleration component in the first direction of desired sensitivity 518. The change in length of the first optical fiber 120 is measured (Step 268) and any change in length of the second optical fiber 516 is also measured (Step 270) using, for example, first and second interferometers respectively operably coupled to or integrally formed with the first and second optical fibers 120, 516, such as Michelson interferometers, Fabry-Perot interferometers, Mach-Zehnder interferometers and/or the like. Alternatively, a distributed strain measurement apparatus, a coherent optical time domain reflectometers (based upon a distributed scattering sensing principle), a DAS system, or an hDVS can be respectively operably coupled to the first and second optical fibers 120, 516 to measure the change in length of the optical fiber 120.

Once changes in length to both the first and second optical fibers 120, 516 have been calculated, a net change can be calculated (Step 272) based upon the following expression:

$$a(t) = a_A(t) - a_B(t)$$

where $a_A(t)$ is the component of acceleration in the first direction of desired sensitivity 518, and $a_B(t)$ is the component of acceleration in the second direction of desired sensitivity 520.

In the above example, due to the presence of the filler material in the void 522, one of the measured components of acceleration should be substantially zero, depending upon the direction of the acceleration event. However, it is necessary to evaluate the above expression in order to avoid the need to determine which side of the bidirectionally sensitive accelerometer device 500 needs to be "read".

The skilled person will appreciate that for acceleration events having a component of acceleration in the second direction of desired sensitivity 520, the above operation of the bi-directionally sensitive accelerometer device 500 is in reverse, although the above-described formula for calculating net acceleration is unchanged.

If desired, in another example, a mass can be coupled to both the first deformable member 504 and the second deformable member 506. Alternatively, a first mass can be coupled to the first deformable member 504 and a second mass can be coupled to the second deformable member 506. In both examples, the mass or masses are used to assist deformation of the first and second deformable members 504, 506 when subjected to accelerations events.

The above-described bi-directionally sensitive accelerometer device 500 can be installed in a cable, for example a sensor cable as described in relation to the previous examples, such as a seismic streamer; an ocean bottom cable; a borehole cable, such as a seismic borehole cable; or a seismic cable.

Figure 18:
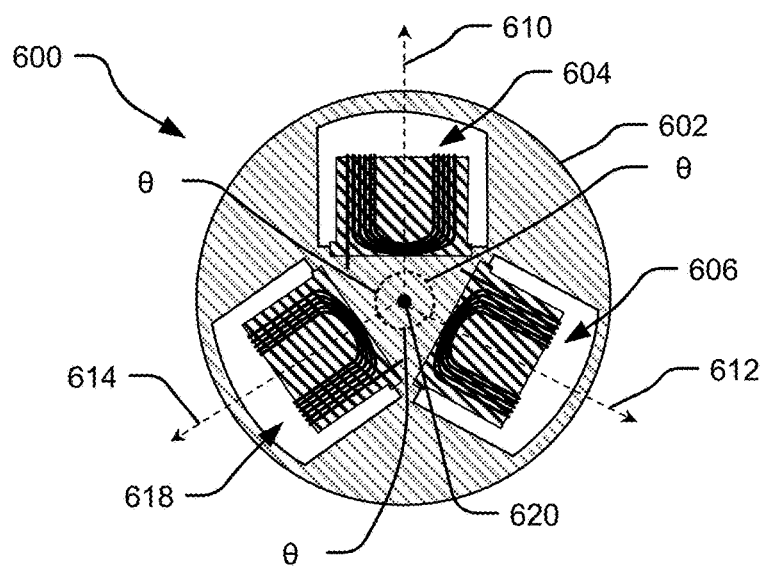
FIG. 18 is a schematic diagram of a tri-directionally sensitive, bi-dimensional, accelerometer device constituting yet another embodiment of the disclosure.

Referring to FIG. 18, a tri-directionally sensitive, bi-dimensional, accelerometer device 600 comprises a housing 602 that retains a first accelerometer device 604, a second accelerometer device 604 and a third accelerometer device 608. The first, second and third accelerometer devices 604, 606, 608 are of the design described above in relation to FIGS. 11 to 13 and each operates in accordance with the method of FIG. 14 described above.

The housing 602 is, in this example, substantially cylindrical in shape for ease of installation in a cable, for example a sensing cable, such as a seismic streamer; an ocean bottom cable; a borehole cable, such as a seismic borehole cable; or a seismic cable. The cable comprises a peripheral wall defining a conduit having a longitudinal axis, the housing 602 being installable in the conduit. The housing 602 therefore possesses a longitudinal axis 620 and the first, second and third accelerometer devices 604, 606, 608 respectively lie on a first radial line 610, a second radial line 612 and a third radial line 614 about the longitudinal axis 620 of the housing 602 or the conduit (when installed), the first, second and third radial lines 610, 612, 614 being angularly separated by an angle, θ, with respect to each other. In this example, the angular spacing is 120 degrees.

In operation, the angular spacing of the first, second and third accelerometer devices 604, 606, 608 ensure sensitivity in both directions of two dimensions of a coordinate system, respectively, for example an x-axis and a y-axis of a Cartesian coordinate system. As such, a single accelerometer device of this kind can be installed in a cable in order to sense components of acceleration events in a plane orthogonal to a longitudinal axis of the cable.

Figure 19:
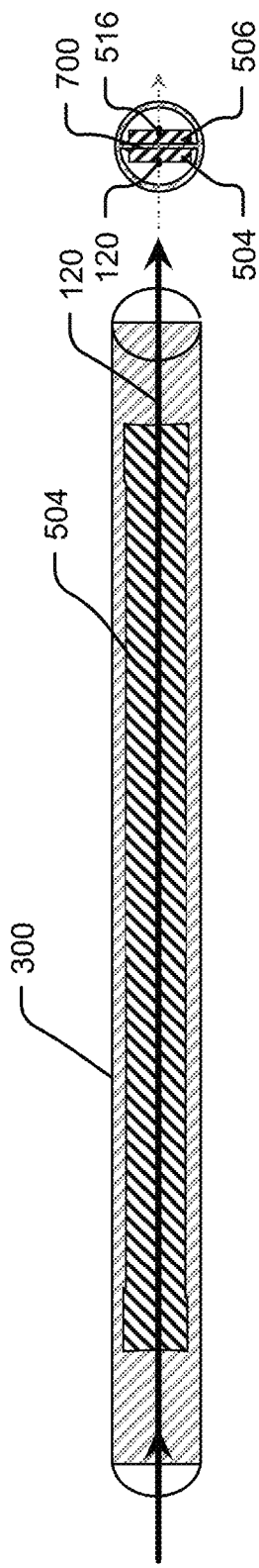
FIG. 19 is a schematic diagram of yet another accelerometer device in cross-section and constituting another embodiment of the disclosure.
Figure 20:
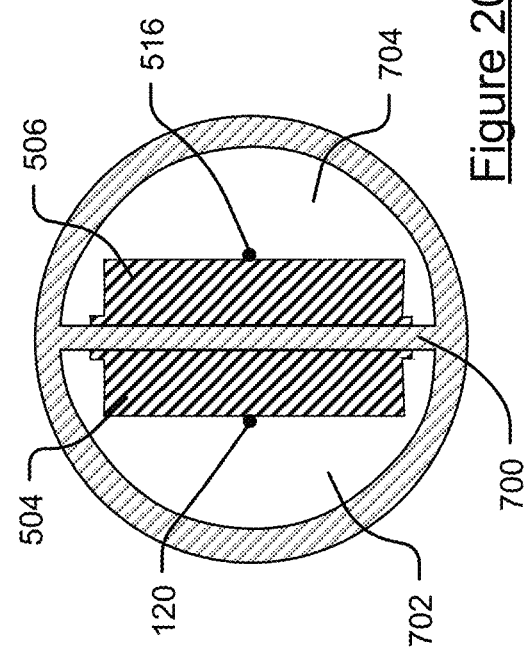
FIG. 20 is a side elevation of the accelerometer device of FIG. 19 in greater detail.

Turning to FIGS. 19 and 20, the embodiment of FIGS. 15 and 16 can be varied as follows. The optical fiber 120 is not wound but instead is a single length that extends along the length of a first elongate deformable member 504. The first deformable member 504 is not pre-deformed; the first deformable member 504 is planar, for example substantially flat. A first optical fiber 120 is coupled to the first deformable member 504 so that the first length of optical fiber 120 is carried by the first deformable member 504. The first deformable member 504 carrying the first optical fiber 120 constitutes a single fiber accelerometer device and can be installed in a cable 300 of the type described above in relation to previous examples.

In this example, the cable 300 comprises a substantially inflexible central longitudinal partition wall 700, effectively dividing the volume of the internal conduit defined by the cable 300 into a first hemispherical (in cross-section) conduit 702 and a second hemispherical conduit 704. The first deformable member 504 carrying the first optical fiber 120 is coupled to the partition wall 700 in the first conduit 702. A second, counterpart, elongate deformable member 506 has a second length of optical fiber 516 coupled thereto. The second optical fiber 516 extends longitudinally along the second deformable member 506. The second deformable member 506 is also coupled to the partition wall 700, but in the second conduit 704. The above-described arrangement therefore constitutes an analog for the bi-directionally sensitive accelerometer device 500 described above in relation to FIG. 15. However, in the present example, single lengths of the fiber as opposed to wound fiber are used to sense accelerations and the first and second deformable members 504, 506 are not predeformed.

Figure 15:
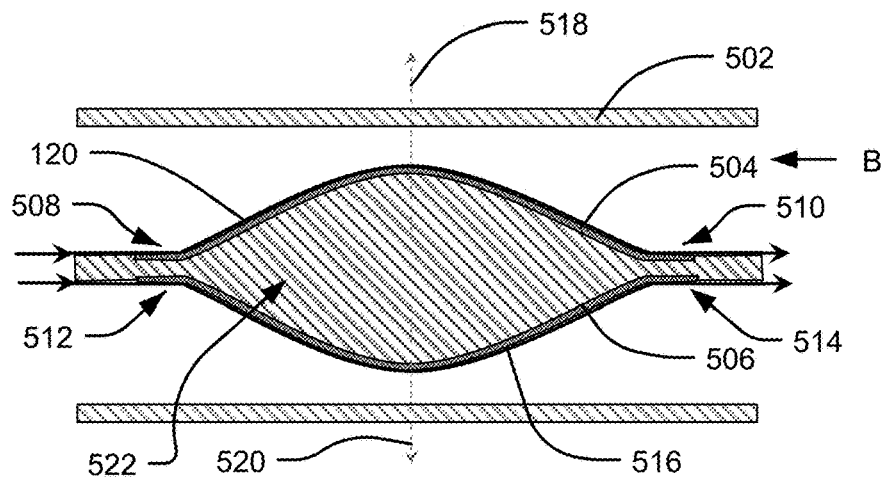
FIG. 15 is a schematic diagram of a bidirectionally sensitive, unidimensional, accelerometer device constituting yet another embodiment of the disclosure.
Figure 16:
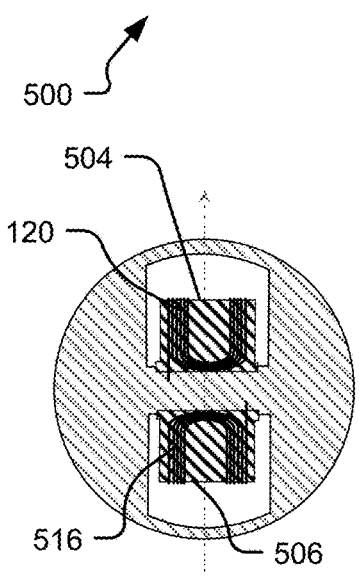
FIG. 16 is a side elevation of the accelerometer device of FIG. 15 from a direction B.

The principle of operation of the accelerometer device of FIGS. 19 and 20 is the same as that for the bi-directionally sensitive accelerometer device 500 of FIG. 15, and so, for the sake of clarity and conciseness of description, will not be described further in respect of FIGS. 19 and 20.

Figure 21:
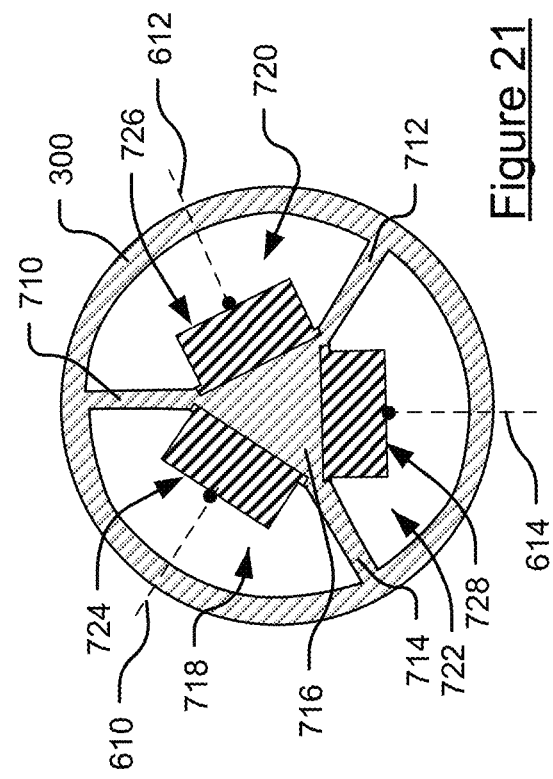
FIG. 21 is a side elevation of an alternative configuration for the accelerometer device of FIG. 19 and constituting yet another embodiment of the disclosure.

Turning to FIG. 21, an analog for the tri-directionally sensitive, bi-dimensional, accelerometer device 600 of FIG. 18 can be formed using the single fiber accelerometer device described above in relation to FIGS. 19 and 20. In this respect, a single fiber accelerometer device comprises an elongate, substantially planar, deformable member and a single length of optical fiber coupled thereto. In this example, the cable 300 comprises three radially extending partition walls 710, 712, 714. The three radially extending partition walls 710, 712, 714 extend outwardly from a bridging portion 716 located in a common central region corresponding to the longitudinal axis of the cable 300 so that a first elongate conduit 718, a second elongate conduit 720 and a third elongate conduit 722 are defined. The bridging portion 716 is, in this example, triangular in shape, for example, in order to provide respective surfaces to which a first single fiber accelerometer device 724, a second single fiber accelerometer device 726 and a third single fiber accelerometer device 728 are coupled. The respective surfaces are respectively orthogonal to a first radial line 610, a second radial line 612 and a third redial line 614, respectively corresponding to directions of sensitivity of the first, second and third single fiber accelerometer devices 724, 726, 728. The first, second and third radial lines 610, 612, 614 are angularly separated by an angle, θ (not shown in FIG. 21), with respect to each other, for example 120°.

In operation, the angular spacing of the first, second and third single fiber accelerometer devices 724, 726, 728 ensure sensitivity in respect of two dimensions of a coordinate system, for example an x-axis and a y-axis of a Cartesian coordinate system. As such, a single accelerometer device of this kind can be installed in a cable in order to sense components of acceleration events in a plane orthogonal to a longitudinal axis of the cable.

It will be understood that the above disclosure provides many different embodiments, or examples, for implementing different features of various embodiments. Specific examples of components and arrangements are described above to simplify the present disclosure. These are, of course, merely examples and are not intended to be limiting. Indeed, variations to the above embodiments are contemplated. For example, when employing any of the accelerometer structures set forth above in conjunction with a distributed strain measurement apparatus, the accelerometer device can be preceded and succeeded by a first winding and a second winding of optical fiber, respectively. The distributed strain measurement apparatus can be a reflectometer, for example a DAS or hDVS system. The reflectometer can be a coherent time domain reflectometer. The reflectometer can be arranged to sample a reflected optical signal at instances in time corresponding to propagation of electromagnetic radiation through the first, preceding, winding and the second, succeeding, winding. The degree of deformation can therefore be determined in respect of a sensing portion of an accelerometer device disposed between the first and second windings using measurements, for example propagation speed, relating to the backscattered electromagnetic radiation sampled in respect of the first and second windings. Indeed, this technique can be applied to other optical accelerometer designs employing the deformation of optical fiber to detect acceleration events.

In the above detailed description, embodiments are described in sufficient detail to enable those skilled in the art to practice the invention. It is to be understood that the various embodiments, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the spirit and scope of the invention. As mentioned above, the above detailed description is, therefore not to be taken in a limiting sense, and the scope of the present invention is defined only by the appended claims, appropriately interpreted, along with the full range of equivalents to which the claims are entitled.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

What is claimed is:

1. An accelerometer device comprising:
   a former;
   an optical fiber wound around the former, the winding of optical fiber having a sensing portion having a first side and a second side opposite the first side, the second side being separated from the former by a gap; and
   a movable element disposed adjacent to the sensing portion of the optical fiber, the movable element being translatable so as to urge against the first side of the sensing portion of the optical fiber in order to vary a length of the optical fiber, the variation in the length of the optical fiber caused by the movable element being indicative of an acceleration in a direction of desired sensitivity, wherein the movable element is external to the winding of the optical fiber.

2. The device according to claim 1, further comprising:
   a protective stop configuration arranged to prevent translation of the movable element beyond a predetermined travel distance.

3. The device according to claim 1, further comprising:
   an interferometer operably coupled to or integrally formed with the optical fiber.

4. The device according to claim 1, further comprising:
   a coherent optical time domain reflectometer operably coupled to the optical fiber.

5. The device according to claim 1, wherein the movable element is coupled to the sensing portion of the optical fiber.

6. The device according to claim 1, wherein the sensing portion of the optical fiber is, when in use, deformable by the movable element.

7. The device according to claim 1, wherein the movable element is arranged to provide a conduit, a strand of the sensing portion of the optical fiber passing through the conduit.

8. The device according to claim 1, wherein
   the sensing portion of the optical fiber comprises a plurality of strands of optical fiber;
   the movable element comprises a plurality of conduits; and
   the plurality of strands respectively pass through the plurality of conduits, the plurality of conduits being spaced to preserve relative positions of the plurality of strands of optical fiber.

9. The device according to claim 1, wherein the movable element is arranged to provide a channel, a strand of the sensing portion of the optical fiber extending substantially within the channel.

10. The device according to claim 1, wherein the movable element comprises mass.

11. The device according to claim 1, further comprising:
    a biasing element coupled to the movable element and arranged to limit force applied by the movable element to the sensing portion of the optical fiber.

12. The device according to claim 11, further comprising:
    an anchoring member, the anchoring member being disposed in a fixed relation with respect to the sensing portion of the optical fiber, wherein the movable element is operably coupled to the anchoring member via the biasing element.

13. The device according to claim 12, further comprising:
    a housing, the housing comprising the anchoring member and houses the former, the optical fiber and the movable element.

14. The device according to claim 12, further comprising:
    a housing having an installation axis; wherein
    the anchoring member comprises a sloped surface inclined relative to the installation axis.

15. The device according to claim 14, wherein
    the former is shaped to define a former slope inclined relative to the installation axis, the sensing portion of the optical fiber wound around the former thereby following the former slope and extending at an incline relative to the installation axis; and
    the sloped surface extends substantially in parallel with the former slope followed by the sensing portion of the optical fiber wound around the former.

16. The device according to claim 1, further comprising:
    a housing having a longitudinal axis.

17. The device according to claim 16, wherein the former is fixed with respect to the housing.

18. The device according to claim 1, wherein
    the sensing portion of the optical fiber comprises a plurality of strands of optical fiber;
    the movable element comprises a plurality of guides; and
    the plurality of guides are arranged to receive the plurality of strands of optical fiber, and to preserve relative position of the plurality of strands of optical fiber.

19. The device according to claim 18, wherein the plurality of guides is a comb structure.

20. The device according to claim 18, wherein
    the plurality of guides is a plurality of channels; and
    the plurality of strands respectively extend substantially within the plurality of channels, the plurality of channels being spaced to preserve relative position of the plurality of strands of optical fiber.

21. The device according to claim 1, further comprising:
    a housing having a longitudinal installation axis;
    wherein the sensing portion of the optical fiber is inclined relative to the installation axis.

22. The device according to claim 21, wherein the former is shaped to define a former slope inclined relative to the installation axis, the sensing portion of the optical fiber around the former thereby following the former slope and extending at an incline relative to the installation axis.

23. The device according to claim 21, wherein the movable element is arranged in sloping relation to the installation axis.

24. The device according to claim 21, wherein a contact surface of the movable element slopes relative to the installation axis.

25. The device according to claim 1, the direction of desired sensitivity extending from the movable element, through the gap, and toward the former.

26. The device according to claim 25, wherein varying a length of the optical fiber by the acceleration in the direction of desired sensitivity is configured to deform the sensing portion across the gap.

27. A cable comprising a first accelerometer device according to claim 1.

28. The cable according to claim 27, further comprising:
    a second accelerometer device; and
    a peripheral wall defining a conduit having a cable longitudinal axis;
    wherein:
    the second accelerometer device comprises:
      a former;
      an optical fiber wound around the former, the winding of optical fiber having a sensing portion that is free to move in relation to a direction of desired sensitivity; and a movable element disposed opposite the sensing portion of the optical fiber, the movable element being translatable so as to urge against the sensing portion of the optical fiber from a position external to the winding of the optical fiber in order to vary a length of the optical fiber, the variation in the length of the optical fiber caused by the movable element being indicative of an acceleration in the direction of desired sensitivity;

the first accelerometer device is oriented within the conduit so that the direction of desired sensitivity of the first accelerometer is a first direction relative to the cable longitudinal axis;

the second accelerometer device is oriented within the conduit so that the direction of desired sensitivity of the second accelerometer is a second direction relative to the cable longitudinal axis; and the first direction is different from the second direction.

29. The cable according to claim 28, wherein the first direction is substantially perpendicular to the second direction.

30. The cable according to claim 28, wherein the first and second directions are substantially perpendicular to the cable longitudinal axis.

31. A seismic streamer comprising the cable according to claim 27.

32. An ocean bottom cable comprising the cable according to claim 27.

33. A cable comprising:
a first accelerometer device according to claim 21;
a second accelerometer device according to claim 21;
a peripheral wall defining a conduit having a cable longitudinal axis; wherein the first accelerometer device is oriented within the conduit so that a first component of the direction of desired sensitivity of the first accelerometer device is a first direction relative to the cable longitudinal axis, a second component of the direction of desired sensitivity of the first accelerometer device is a second direction relative to the cable longitudinal axis and a third component of the direction of desired sensitivity of the first accelerometer is a third direction relative to the cable longitudinal axis; and the second accelerometer device is oriented within the conduit so that a first component of the direction of desired sensitivity of the second accelerometer device is a fourth direction relative to the cable longitudinal axis, a second component of the direction of desired sensitivity of the second accelerometer device is substantially the second direction relative to the cable longitudinal axis, and a third component of the direction of desired sensitivity of the second accelerometer device is a fifth direction relative to the cable longitudinal axis.

34. The cable according to claim 33, wherein the first direction is substantially parallel with the cable longitudinal axis.

35. The cable according to claim 34, wherein the second and third directions are substantially perpendicular with respect to each other and the cable longitudinal axis.

36. A seismic streamer comprising the cable according to claim 33.

37. An ocean bottom cable comprising the cable according to claim 33.

38. A method of sensing acceleration, the method comprising:
providing a winding of optical fiber around a frame, the optical fiber having a sensing portion that bridges a gap formed between the optical fiber and the frame;
disposing a movable element adjacent to the sensing portion of the optical fiber and external to the winding of the optical fiber;
moving a movable element in response to an acceleration event in order to vary contact between the movable element and the sensing portion of the optical fiber, thereby varying a length of the optical fiber, the variation in the length of the optical fiber being indicative of an acceleration in a direction of desired sensitivity.

39. The method according to claim 38, further comprising:
providing a housing having a longitudinal installation axis; wherein inclining the sensing portion of the optical fiber relative to the installation axis.

40. The method of claim 38, the direction of desired sensitivity extending from the movable element, through the gap, and toward the frame.

41. The method according to claim 40, wherein moving the movable element in response to the acceleration deforms the sensing portion across the gap.

* * * * *